Figure 1:
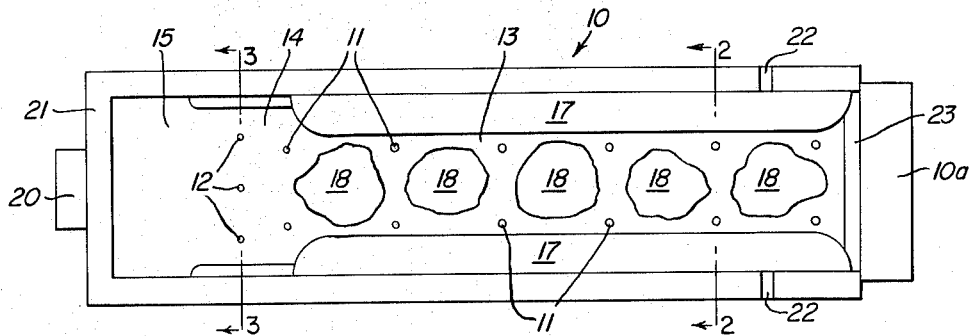

Dec. 7, 1965  G. C. BEALS ETAL  3,222,162
REVERBERATORY MATTE-SMELTING PROCESS
Filed April 17, 1963

*INVENTORS*
GEORGE C. BEALS
JOHN KOCHERHANS
BY KENDAL M. OGILVIE

ATTORNEYS

3,222,162
REVERBERATORY MATTE-SMELTING PROCESS
George C. Beals, John Kocherhans, and Kendal M. Ogilvie, Salt Lake City, Utah, assignors to Kennecott Copper Corporation, New York, N.Y., a corporation of New York
Filed Apr. 17, 1963, Ser. No. 273,767
5 Claims. (Cl. 75—73)

The invention relates to the smelting of ores in a reverberatory furnace for the recovery of non-ferrous metals, especially copper, in a metallic sulfide matte. It involves improvements productive of results superior to those of any previously known procedure of this kind.

In the usual matte smelting practice, as carried out in a standard reverberatory furnace, ore concentrates are charged into the furnace and heated to form a molten bath made up of a metallic sulfide matte, which sinks to the bottom, and a normally waste slag, which collects above.

The ore concentrates, either wet or calcined, may be introduced into the furnace along opposite sides of the bath as masses of charged ore materials in the form of piles, from which exposed, superficial portions slough off and run into the bath as they become molten under smelting heat provided by the furnace, or such concentrates may be introduced directly onto the surface of the bath as masses of charged ore materials which float and melt to supply molten material to the bath in much the same manner as the side charge piles. In either case, a set of burners at one end of the furnace supplies the heat. Products of combustion are discharged into an uptake and slag is drawn off through tap holes, both located at the opposite end of the furnace, which is provided with a so-called "skim bay" for the slag. The entire bath is quiescent.

One of the difficulties encountered in this type of smelting is the entrapment by the slag of very small droplets or prills of matte and the consequent loss of recovery of metal values. Another is the build-up of magnetite ($Fe_3O_4$) on the hearth of the furnace.

Principal objects in the making of the invention were to minimize the loss of metal values in the slag as well as the build-up of magnetite on the hearth, and, at the same time, to increase the furnace throughput rate.

These objects are achieved by splashing molten material from the bath onto exposed, superficial areas of the charge piles and/or floating charge, while increasing available furnace heat, and by, at the same time, agitating the bath across its width in advance of a quiescent portion thereof at the slag-removal end of the furnace.

Both the splashing and the agitation of the molten bath are preferably and advantageously accomplished by injecting an oxygen-rich gas thereinto, desirably below the surface thereof to prevent such extreme splashing as will endanger the refractory brickwork. In this manner, the temperature of splashed portions and of agitated portions of the molten bath is increased (due to oxidation of iron and sulfur, i.e. one to three tons per ton of oxygen contained in the oxygen-rich gas) to an extent that renders the slag and the matte within the zones concerned unusually fluid and facilitates their intermixture. The resulting intimate contact between slag and matte and the fact that the increase in temperature of the matte prills decreases their surface tension and enables them to coalesce more readily, brings about an unusually effective coalescence and agglomeration of the matte prills with respect to each other and to the body of matte in general. This enables a considerably more effective separation of matte and slag within the subsequent quiescent zone than has been possible heretofore.

Increased temperature of the slag-magnetite-matte interface, in those instances where the formation of magnetite presents a problem, tends to eliminate magnetite slush by dissolving it in the matte and the slag. The rate of the chemical reaction between FeS in the matte and the $Fe_3O_4$ is increased. Thus, the magnetite barrier between the matte and the slag is largely avoided.

Splashing of superheated portions of the molten bath on the masses of charged ore materials increases the smelting rate of the charged materials in a most effective manner. Not only is the increased heat of the bath imparted to the as-yet-unmelted materials by conduction, but refractory materials are washed from the surfaces of the charge masses, so that the usual radiant heating from furnace operation is made more effective. Moreover, there is direct transfer of heat to both matte and slag by the splashing thereof into the combustion flame and gases. Another advantage of significance is the additional elimination (over and above that achieved by oxidation within the bath) of iron and sulfur from the matte by its contact with the combustion gases. It is also likely that some sulfur is driven off by the localized increased temperature of the matte and the accompanying variation of its chemical equilibrium. The sulfur dioxide content of reverberatory offtake gases can be significantly increased, e.g. from the usual 1.0 to 3.0 percent concentration, to a point suitable for the economic manufacture of sulfuric acid (about 4.0% $SO_2$ minimum) by regulating the quantity of oxygen introduced.

Intermixing of slag and matte in the smelting zone by reason of the agitation accompanying injection of the oxygen-rich gas equalizes their respective temperatures and initiates a slag cleaning action which is completed in the bath-agitation zone and in the subsequent quiescent settling zone.

Within the bath-agitation zone, where the agitation need not be and preferably is not as vigorous as in the smelting zone, a "rain" of matte droplets (as distinguished from the very fine prills) is caused to pass through the slag by reason of the agitation and by the increased fluidity of both slag and matte. This agglomerates the prills that would not normally settle out of the slag and effects a marked reduction in metallic values lost with the slag. The use of an oxygen-rich gas to perform the agitation brings about the elevated bath temperature necessary to effect superior separating and slag-cleaning action.

Slag-cleaning by bath agitation beyond the smelting zone by the injection of an inert gas has been suggested heretofore (see Simcox et al. U.S. Patent No. 2,035,016), and agitation of the bath within the smelting zone by the injection of a heat-imparting mixture of fuel and air has also been suggested (see King U.S. Patent No. 1,425,386). Yet the advantages of superheating and splashing portions of the molten bath on charge masses to increase the smelting rate and to thereby make it possible to shorten the furnace, if desired; of superheating portions of the bath in a bath-agitation zone for purposes of slag cleaning; and of initiating slag cleaning in the smelting zone, followed by completion of same in a bath-agitation zone and subsequent quiescent settling zone, have never been recognized previously. Also, the advantages of injecting an oxygen-rich gas, preferably commercially pure oxygen or oxygen-enriched air, into the molten bath to supplement, in a matte-smelting operation of this kind, the customary heat supplied by the burners (as contrasted with the mixture of fuel and air in accordance with the aforementioned King patent) have been recognized previously. In this connection, it should be realized that the oxygen introduced by the present process is substantially all available for chemical combination in the smelting process.

As just indicated, the oxygen-rich gas utilized in the process is commercially pure oxygen or oxygen-enriched air. The expression "oxygen-rich" gas is used in contradistinction to the steam or other inert gas called for by the aforementioned Simcox et al. patent and serves to produce heat by oxidation of matte constituents.

It is possible to utilize air alone as a splashing agent and may even be possible to utilize it as a bath-agitation agent within the scope of the term "oxygen-rich gas." This has not yet been ascertained by tests of commercial scale, although in pilot plant tests sufficient heat was not generated. It is even possible to get some of the benefits of the process by splashing the molten bath in the smelting zone and by agitating it in the bath-agitation zone in some way other than by gas injection, e.g. by mechanical or vibratory agitation, it being the splash action and the combination therewith of bath agitation, accompanied by an increase of available furnace heat in some manner, that are significant. Although increase in available furnace heat can be attained otherwise, the injection of pure oxygen or of oxygen-enriched air for the purpose is much preferred, and, from this standpoint, constitutes an important feature of the invention.

The process of the invention is described in detail hereinafter and is illustrated in the accompanying drawing with respect to specific apparatus presently regarded as the best mode of carrying out the process in practice. From this detailed disclosure, other more specific objects and features of the invention will become apparent.

Figure 2:
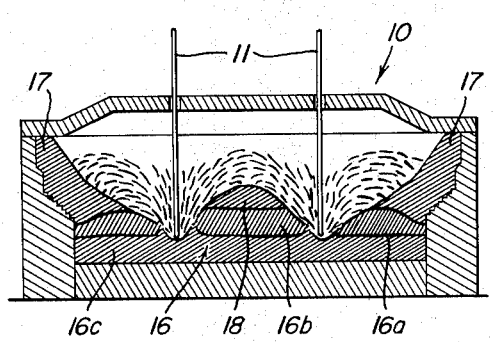
Figure 3:
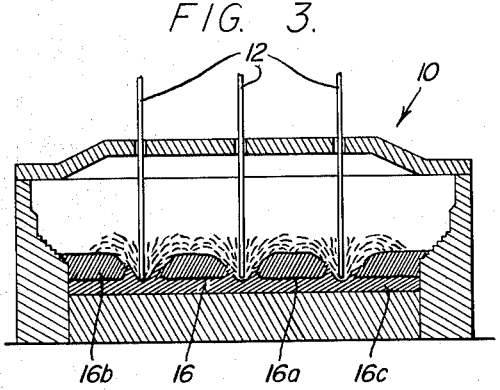
Figure 4:
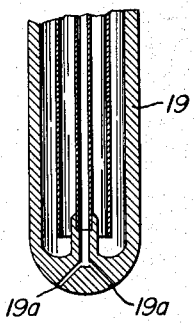

In the drawing:

FIG. 1 is a strictly schematic or diagrammatic layout in plan of the interior of a standard reverberatory furnace modified only by the provision of oxygen lances to define an unusually elongate smelting zone and a transversely oriented bath-agitation zone for the injection of an oxygen-rich gas into the usual molten bath within the furnace;

FIG. 2, a similar biew in transverse vertical section taken along the line 2—2 of FIG. 1;

FIG. 3, another similar view in transverse vertical section taken along the line 3—3 of FIG. 1; and FIG. 4, an enlarged fragmentary view in axial vertical section showing, schematically, the tip of one of the oxygen lances.

Referring to the drawing:

The reverberatory furnace 10 utilized for the process in the illustrated instance is similar in all respects to a standard furnace of the type concerned, except for the provision of oxygen lances 11 and 12 at strategic locations within an elongate smelting zone 13 and a relatively short bath-agitation zone 14, respectively, the latter being disposed in this instance between the smelting zone and a quiescent settling zone 15. Although the lances 11 and 12 need not discharge below the surface of the bath 16 to achieve the splashing and agitating action desired, it is preferable that they do so to avoid too great splashing, which would be destructive of the refractory brickwork of the furnace. The level of lance discharge within the bath may vary from a location below to a location above the slag-matte interface 16a and the discharge may be intermittent, although continuous discharge is usually preferred. Burners 10a fire the furnace in customary manner, and ore concentrates are charged in the usual fashion to form either side charge piles 17 or bath charge masses 18 or both.

Although shortening of the usual reverberatory furnace, without decreasing the normal smelting rate, is possible by use of the invention, a considerably increased smelting rate is achieved in a furnace of standard length, as illustrated, by lengthening the primary smelting zone (by the provision of splash lances 11 in normally cooler, charge-pile portions of the furnace) to include the full length of the side charge piles 17 and to enable an unusually great number of bath charge masses 18 to be effectively smelted.

The lances 11 are disposed at intervals along the length of smelting zone 13 in an arrangement which enables the injection of an oxygen-rich gas at an acceptable rate to splash significant quantities of the molten material onto exposed, superficial areas of the masses of charged ore materials 17 and 18, as indicated in FIG. 2. The exact arrangement will depend upon all the circumstances and may require a certain amount of testing for any given installation. The manner in which the lance tip is directed, as well as its proximity to a charge mass, will, of course, have considerable to do with determining the nature of the splash pattern. The positional arrangement shown, utilizing multi-orifice lance tips, such as indicated at 19, FIG. 4, which have laterally directed orifices 19a, is typical.

The lances 12 are advantageously arranged in a straight line extending transversely across the molten bath. Although here shown as constituting a special agitation zone located beyond the smelting zone 13, they could be located within and across the smelting zone, near its termination. In this connection, it should be realized that the extent of the smelting zone, as that term is used here, is determined by the presence of splash lances 11, rather than by the extent of the charge masses.

Slag 10b is discharged in conventional manner by means of an ordinary skim bay 20 located at the front wall 21 of the furnace. Matte 10c is similarly discharged at the opposite or burner end of the furnace through suitable tap holes 22 preferably located in the side walls of the furnace near the bridge wall 23 and at level below the charge piles, all in accordance with common practice.

In pilot plant tests, utilizing a single oxygen lance discharging commercially pure oxygen through two laterally directed, tip orifices, each ¼ inch in diameter, on a lance shank directed vertically downwardly in the middle of a molten bath three feet wide and eighteen inches deep between vertically opposite, side charge piles, molten material comprising both matte and slag was splashed well up into the reactive atmosphere of the furnace at substantially all sides, and sheet-like quantities of the molten material were deposited on extensive, exposed, superficial areas of both charge piles, washing such areas free of refractory skin which had formed thereover by the action of burner heat and supplying additional smelting heat to the charged ore materials.

Following are tabulations of data and metallurgical calculations from a series of comparative tests:

TABLE I.—TEST DATA
*Oxygen smelting in pilot furnace*

|  | Conventional wet feed smelting [1] | Oxygen bath lance operation | | |
| --- | --- | --- | --- | --- |
|  |  | For smelting [2] | For smelting and slag cleaning [2] | For slag cleaning |
| Heat in Natural Gas Fuel—B.t.u.×10⁶/day | 171.7 | 165.0 | 165.0 | 165.0 |
| SCFM 99.5 plus percent $O_2$ Through Lance | 0 | 167.7 | 167.7 | 101.2 |
| Uptake Oxygen—Percent (Dry) | 1.2 | 0.2 | 0.6 | 1.8 |
| Uptake Sulfur Dioxide—Percent (Dry) | 1.9 | 17.0 | 18.0 | 12.0 |
| Slag Copper—Percent | 0.58 | 0.79 | 0.57 | 0.43 |
| Dry TPD Concentrates Smelted | 22.9 | 109.7 | 101.1 | 35.2 |
| Matte Grade—Percent Copper | 38.0 | 42.6 | 41.8 | 48.8 |

[1] Average of four furnace standardization tests.
[2] Short duration tests (2 hours) extrapolated to 24 hours.

TABLE II.—METALLURGICAL CACULATIONS
*Oxygen smelting in pilot furnace*

|  | Conventional wet feed smelting [1] | Oxygen bath lance operation | | |
| --- | --- | --- | --- | --- |
|  |  | For smelting [2] | For smelting and slag cleaning [2] | For slag cleaning |
| Furnace hearth area—square feet | 110.0 | 110.0 | 110.0 | 110.0 |
| Dry TPD concentrate smelted per sq. ft. hearth area | 0.21 | 1.0 | 0.92 | 0.32 |
| Heat in fuel—B.t.u.×10⁶/day | 171.7 | 165.0 | 165.0 | 165.0 |
| Heat in preheated air—B.t.u.×10⁶/day | 20.8 | 20.4 | 20.0 | 19.8 |
| Total heat to furnace—B.t.u.×10⁶/day | 192.5 | 185.4 | 185.0 | 184.8 |
| Heat required to smelt one dry ton concentrates—B.t.u.×10⁶ | 8.40 | 1.69 | 1.83 | 5.25 |
| Furnace slag settling area—sq. ft. | 57.0 | 45.0 | 45.0 | 45.0 |
| Slag settling—sq. ft./daily ton slag | 3.85 | -------- | 1.12 | 3.55 |
| Slag retention—hours in settler | 5.03 | -------- | 0.96 | 3.04 |
| Slag copper loss—lbs. cu. in. slag per ton cu. in. concentrates | 18.1 | -------- | 15.4 | 10.6 |
| Slag factor—percent cu. in. slag×100÷percent cu. in. Matte | 1.53 | 1.85 | 1.36 | 0.88 |

[1] Average of four furnace standardization tests.
[2] Short duration tests (2 hours) extrapolated to 24 hours.

Although the illustrated reverberatory furnace is equipped for combination splash smelting and slag cleaning within a bath-agitation zone in accordance with the overall process of the invention, it is to be understood that splash smelting, as such, when accompanied by an increasing of the available furnace heat in some appropriate manner, e.g. by splashing with an oxygen-rich gas, by stepping up burner heat, or by splash-contacting burner heat which would be otherwise wasted, is considered novel and can be used alone if desired. Nevertheless, the combination of the two enables the overall length of a reverberatory furnace to be shortened, if desired, by reason of the intensification of both the smelting and slag-cleaning reactions and by the fact that the homogenous slag from the splash smelting zone, being, in effect, preliminarily cleaned, makes for more efficient slag cleaning in the subsequent bath-agitation stage.

Whereas there are here illustrated and specifically described certain preferred procedures and apparatus presently regarded as the best mode of carrying out the invention, it should be realized that various changes may be made and other procedures and constructions adopted without departing from the inventive subject matter particularly pointed out and claimed herebelow.

We claim:
1. In matte-smelting practice utilizing a reverberatory furnace, wherein a bath of matte and slag is produced and maintained in molten condition by burners which are located at one end of the furnace and generate smelting heat active on masses of ore materials charged into said furnace along a major portion of its length commencing at the burner end thereof, said bath being maintained in quiescent condition along a portion of the length of the furnace at its opposite end, and wherein matte and slag are separately drawn off, the latter from the quiescent portion of said bath, the improvement comprising:
   splashing molten bath material from said bath onto exposed, superficial areas of the masses of charged ore materials, while increasing the available furnace heat; and agitating the molten bath across its width in advance of the said quiescent portion of the bath, both the agitation and the splashing of molten material being effected by the injection of an oxygen-rich gas into the molten bath in the vicinity of the masses of charged ore materials.

2. In matte-smelting practice utilizing a reverberatory furnace, wherein a bath of matte and slag is produced and maintained in molten condition by burners which are located at one end of the furnace and generate smelting heat active on masses of ore materials charged into said furnace along a major portion of its length commencing at the burner end thereof, said bath being maintained in quiescent condition along a portion of the length of the furnace at its opposite end, and wherein matte and slag are separately drawn off, the latter from the quiescent portion of said bath, the improvement comprising:

washing and superheating exposed, superficial areas of the masses of charged ore materials by injecting an oxygen-rich gas into the bath at intervals along its length in such manner as to splash molten material onto exposed, superficial areas of the said masses; and cleaning the slag by injecting an oxygen-rich gas into and across the bath in advance of the said quiescent portion thereof to agitate and intermix the slag and matte.

3. The improvement of claim 2, wherein the rates of gas injection for splash smelting and for bath-agitation are controlled relative to each other in accordance with varying results desired of the process.

4. In matte-smelting practice utilizing a reverberatory furnace, wherein a bath of matte and slag is produced and maintained in molten condition by burners which are located at one end of the furnace and generate smelting heat active on masses of ore materials charged into said furnace along a major portion of its length commencing at the burner end thereof, said bath being maintained in quiescent condition along a portion of the length of the furnace at its opposite end, and wherein matte and slag are separately drawn off, the latter from the quiescent portion of said bath, the improvement comprising:

injecting an oxygen-rich gas into the bath in the vicinity of the masses of charged ore materials for splashing molten material from said bath onto exposed, superficial areas of the masses of charged ore materials while increasing the available furnace heat.

5. In matte-smelting practice utilizing a reverberatory furnace, wherein a bath of matte and slag is produced and maintained in molten condition by burners which are located at one end of the furnace and generate smelting heat active on masses of ore materials charged into said furnace along a major portion of its length commencing at the burner end thereof, said bath being maintained in piescent condition along a portion of the length of the furnace at its opposite end, and wherein matte and slag are separately drawn off, the latter from the quiescent portion of said bath, the improvement comprising:

cleaning the slag by injecting an oxygen-rich gas into and across the bath in advance of the said quiescent portion of the bath.

References Cited by the Examiner

UNITED STATES PATENTS

| | | | |
|---|---|---|---|
| 1,296,478 | 3/1919 | Carson | 75—73 |
| 1,803,663 | 5/1931 | Carson | 75—73 |
| 1,940,977 | 12/1933 | Simpson | 75—74 |
| 2,962,277 | 11/1960 | Morrill | 22—200.1 |
| 3,102,806 | 9/1963 | Zimmerley | 75—65 |

DAVID L. RECK, *Primary Examiner.*